United States Patent
Wright et al.

(10) Patent No.: US 12,518,256 B2
(45) Date of Patent: *Jan. 6, 2026

(54) METHODS AND SYSTEMS FOR RECORDING MULTIPLE TRANSACTIONS ON A BLOCKCHAIN

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 196 days.

This patent is subject to a terminal disclaimer.

(21) Appl. No.: 17/592,204

(22) Filed: Feb. 3, 2022

(65) Prior Publication Data

US 2022/0230147 A1    Jul. 21, 2022

Related U.S. Application Data

(63) Continuation of application No. 16/088,026, filed as application No. PCT/IB2017/051715 on Mar. 24, 2017, now Pat. No. 11,244,292.

(30) Foreign Application Priority Data

Mar. 24, 2016  (GB) ..................... 1605032

(51) Int. Cl.
  *G06Q 20/06*    (2012.01)
  *G06Q 20/38*    (2012.01)
  *G06Q 20/40*    (2012.01)

(52) U.S. Cl.
  CPC ....... *G06Q 20/0658* (2013.01); *G06Q 20/382* (2013.01); *G06Q 20/3823* (2013.01);
  (Continued)

(58) Field of Classification Search
  None
  See application file for complete search history.

(56) References Cited

U.S. PATENT DOCUMENTS 9,818,116 B2 * 11/2017 Caldera .................. H04L 9/50
9,852,427 B2 * 12/2017 Caldera ............... G06Q 20/065
(Continued)

FOREIGN PATENT DOCUMENTS

CN    104320262 A  *  1/2015
CN    104392354 A  *  3/2015    ....... G06Q 20/38215
(Continued)

OTHER PUBLICATIONS

Ben-Sasson et al. Zerocash: Decentralized Anonymous Payments from Bitcoin. https://eprint.iacr.org/2014/349.pdf (Year: 2014).*
(Continued)

*Primary Examiner* — El Mehdi Oussir
(74) *Attorney, Agent, or Firm* — Tarolli, Sundheim, Covell & Tummino LLP

(57) ABSTRACT

Techniques are presented for a method and system of recording multiple transactions between a multiple of users on a blockchain. Steps may include: receiving a first request from a first node associated with a first user to transfer a first quantity of cryptocurrency associated with a first transaction and receiving a second request from a second node to transfer a second quantity associated with a second transaction, where the first transaction is conditional on receiving the second request and the second transaction is conditional on receiving the first request; verifying the first request and second request include determining both the conditional steps are satisfied; and based on the verifying, sending a data output to the blockchain to record the transfers of cryptocurrency associated with the first and second transactions.

12 Claims, 6 Drawing Sheets

(52) U.S. Cl.
CPC ..... *G06Q 20/3827* (2013.01); *G06Q 20/3829* (2013.01); *G06Q 20/389* (2013.01); *G06Q 20/40* (2013.01); *G06Q 20/405* (2013.01); *G06Q 2220/00* (2013.01)

(56) References Cited

U.S. PATENT DOCUMENTS

| | | | |
|---|---|---|---|
| 10,050,779 | B2 | 8/2018 | Alness et al. |
| 11,120,438 | B1* | 9/2021 | Belshe ................. H04L 9/0897 |
| 12,088,541 | B1* | 9/2024 | Kheit ................... H04L 51/046 |
| 12,225,127 | B2* | 2/2025 | Tsitrin ...................... H04L 9/50 |
| 12,273,324 | B2* | 4/2025 | Covaci ................... H04L 63/04 |
| 2002/0198843 | A1* | 12/2002 | Wang ...................... H04L 63/10 705/51 |
| 2004/0034582 | A1* | 2/2004 | Gilliam ............... H04L 63/0428 705/31 |
| 2008/0262969 | A1* | 10/2008 | Samid .................. G06Q 20/223 705/64 |
| 2015/0120569 | A1* | 4/2015 | Belshe ............... G06Q 20/3829 705/71 |
| 2015/0186864 | A1* | 7/2015 | Jones ................. G06Q 20/3278 705/39 |
| 2015/0206106 | A1 | 7/2015 | Yago |
| 2015/0244690 | A1 | 8/2015 | Mossbarger |
| 2015/0269539 | A1 | 9/2015 | MacGregor et al. |
| 2015/0302401 | A1 | 10/2015 | Metral |
| 2015/0332395 | A1* | 11/2015 | Walker ............... G06Q 20/3678 705/69 |
| 2015/0363777 | A1 | 12/2015 | Ronca et al. |
| 2015/0363782 | A1 | 12/2015 | Ronca et al. |
| 2015/0363783 | A1 | 12/2015 | Ronca et al. |
| 2015/0379510 | A1 | 12/2015 | Smith |
| 2016/0005032 | A1* | 1/2016 | Yau .................... G06Q 20/3674 705/69 |
| 2016/0071108 | A1 | 3/2016 | Caldera et al. |
| 2016/0196553 | A1* | 7/2016 | Barhydt ............. G06Q 20/3829 705/44 |
| 2016/0330034 | A1* | 11/2016 | Back ...................... G06Q 20/065 |
| 2016/0358135 | A1* | 12/2016 | Liao .................... G06Q 20/3827 |
| 2017/0005804 | A1* | 1/2017 | Zinder .................. H04L 9/3247 |
| 2017/0091726 | A1* | 3/2017 | Morgan ............... G06Q 20/065 |
| 2017/0155515 | A1 | 6/2017 | Androulaki et al. |
| 2017/0236121 | A1 | 8/2017 | Lyons et al. |
| 2017/0278081 | A1* | 9/2017 | Walker ................. G06Q 20/065 |
| 2017/0317997 | A1* | 11/2017 | Smith ..................... H04L 9/14 |
| 2018/0191503 | A1* | 7/2018 | Alwar ................... H04L 9/3242 |
| 2018/0349877 | A9* | 12/2018 | Maim ..................... H04L 9/14 |
| 2019/0386969 | A1* | 12/2019 | Verzun ................. G06F 21/606 |
| 2021/0152371 | A1* | 5/2021 | Fletcher ............... H04L 9/3247 |
| 2021/0226795 | A1* | 7/2021 | Covaci ................. H04L 9/3247 |

FOREIGN PATENT DOCUMENTS

| | | | | |
|---|---|---|---|---|
| CN | 105162596 | A * | 12/2015 | ............ G06F 21/33 |
| CN | 105373955 | B * | 7/2020 | |
| EP | 2953076 | A1 | 12/2015 | |
| EP | 3073670 | A1 * | 9/2016 | ........... G06Q 20/065 |
| EP | 3281163 | A1 * | 2/2018 | ............. G06Q 20/02 |
| EP | 3707872 | B1 * | 6/2024 | ............. H04L 9/3297 |
| ES | 2935369 | T3 * | 3/2023 | ............. G06Q 20/06 |
| JP | 2023036786 | A * | 3/2023 | ............. G06Q 20/02 |
| JP | 2025016767 | A * | 2/2025 | ......... G06V 10/7557 |
| KR | 10-2015-0144645 | A | 12/2015 | |
| WO | 2015171580 | A1 | 11/2015 | |
| WO | 2016161073 | A1 | 10/2016 | |
| WO | 2016164310 | A1 | 10/2016 | |
| WO | WO-2017007806 | A1 * | 1/2017 | ........... G06F 21/645 |
| WO | WO-2019092552 | A1 * | 5/2019 | ............. H04L 63/04 |

OTHER PUBLICATIONS

C. Wright and A. Serguieva, "Sustainable blockchain-enabled services: Smart contracts," 2017 IEEE International Conference on Big Data (Big Data), Boston, MA, USA, 2017, pp. 4255-4264. https://ieeexplore.ieee.org/document/8258452?source=IQplus (Year: 2018).*
K. Christidis and M. Devetsikiotis, "Blockchains and Smart Contracts for the Internet of Things," in IEEE Access, vol. 4, pp. 2292-2303, 2016. https://ieeexplore.ieee.org/document/7467408?source=IQplus (Year: 2016).*
F. Tschorsch and B. Scheuermann, "Bitcoin and Beyond: A Technical Survey on Decentralized Digital Currencies," in IEEE Communications Surveys & Tutorials, vol. 18, No. 3, pp. 2084-2123, thirdquarter 2016. https://ieeexplore.ieee.org/document/7423672?source=IQplus (Year: 2016).*
Nakamoto, "Bitcoin: A Peer-to-Peer Electronic Cash System," Bitcoin, Oct. 31, 2008, https://bitcoin.org/bitcoin.pdf, 9 pages.
Oraclize, "API Reference," retrieved from http://docs.oraclize.it, Dec. 19, 2016, 9 pages.
Satoshi et al., "Connection Limits," Bitcoin Forum, Aug. 9, 2010, https://bitcointalk.org/index.php?topic=741.0; prev_next=prev, 2 pages.
Anonymous: "Adding Metadata to the Blockchain, part 1," Digiconomist, https://digiconomisl.nel/adding-metadatablockchain-part-1, Dec. 23, 2015, 5 pages.
Anonymous: "Bitrated trade process," Imgur, http://imgur.com/a/DM3Dy, Feb. 21, 2015 [retrieved Feb. 25, 2021], 8 pages.
Antonopoulos: "Mastering Bitcoin—Unlocking Digital Cryptocurrencies," O'Reilly Media, Inc., Dec. 20, 2014, 282 pages.
Bertani: "Fehu: E-commerce and security, on the same page," Fehu Labs, Apr. 19, 2016, 22 pages.
Bitrated: "Frequently Asked Questions," https://www.bitrated.com/faq, copyright 2013-2021 [retrieved Feb. 25, 2021], 4 pages.
Buterin: "Bitrated: You Can No Longer Say Bitcoin Has No Consumer Protection," Bitcoin Magazine, https://bitcoinmagazine.com/articles/bitrated-you-can-no-longer-say-bitcoin-has-no-consumer-protection-1386696848, Dec. 10, 2013 [retrieved Feb. 25, 2021], 5 pages.
Pour: "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Provable: "Home," https://docs.provable.xyz/#home, Aug. 28, 2019 [retrieved Feb. 25, 2021], 45 pages.
Volkmann et al.: "Bitcoin StackExchange", https://bitcoin.stackexchange.com/questions/13942/authentificate-myself-as-the-sender--of-a-bitcoin-transaction, Oct. 21, 2013 [retrieved Feb. 25, 2021], 2 pages.
International Search Report and Written Opinion mailed Jun. 9, 2017, Patent Application No. PCT/IB2017/051715, 10 pages.
Florian Tschorsch et al: "Bitcoin and Beyond: A Technical Survey on Decentralized Digital Currencies," in IEEE Communications Surveys & Tutorials, vol. 18, No. 3, pp. 2084-2123, thirdquarter 2016. https://ieeexplore.ieee.org/document/7423672?source=IQplus (Year: 2016).
Konstantinos Christidis et al: "Blockchains and Smart Contracts for the Internet of Things," in IEEE Access, vol. 4, pp. 2292-2303, 2016. https://ieeexplore.ieee.org/document/7467408?source=IQplus (Year: 2016).

* cited by examiner

METHODS AND SYSTEMS FOR RECORDING MULTIPLE TRANSACTIONS ON A BLOCKCHAIN

CROSS REFERENCE TO RELATED APPLICATIONS

This application is a continuation of U.S. patent application Ser. No. 16/088,026, filed Sep. 24, 2018, which is a 371 National Stage of International Patent Application No. PCT/IB2017/051715, filed Mar. 24, 2017, which claims priority to United Kingdom Patent Application No. 1605032.0, filed Mar. 24, 2016, the disclosures of which are incorporated herein by reference in their entirety.

TECHNICAL FIELD

The present disclosure relates generally to transactions recorded on a peer-to-peer distributed ledger (blockchain), and more particularly for executing bidirectional transactions between two users.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

A cryptocurrency transaction may involve multiple parties, with multiple inputs and multiple outputs. Such multiparty transactions may occur where multiple parties have agreed to form a single transaction (in the sense that a single transaction with multiple inputs and multiple outputs is recorded on a blockchain) to improve privacy. For example, if Alice wishes to transact with Bob, Alice may seek other parties (such as Carol) who may also wish to perform a transaction and to make a joint payment together (such as a "CoinJoin" transaction).

Contractual obligations can include consideration that is bidirectional. For example Alice may wish to purchase a widget from Bob in exchange for money. Thus fulfilling the contract includes consideration in one direction that includes a payment of money from Alice to Bob. The other consideration in the opposite direction includes Bob providing the widget from Bob to Alice.

An issue may arise where only one side fulfils their obligation in one direction. For example, if Alice makes the payment of money from Alice to Bob and Bob absconds with the money without supplying the widget.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

There is provided an invention as defined in the appended claims.

The invention may be described as a blockchain and/or computer implemented method and corresponding system(s) and device(s). It may be a verification method/system for verifying the authorisation of a blockchain transaction (Tx) prior to performing the transaction. Thus, additionally or alternatively, the invention may be a security method/system arranged to ensure that only authorised transactions are performed. Additionally or alternatively, the invention be a control method/system arranged to determine when a transaction may be conducted on the blockchain and/or when it should be prohibited. Performance of the transaction (Tx) may comprise a transfer of an amount of cryptocurrency from one party or user to another.

The invention may provide a verification and/or control method arranged to simultaneously release more than one blockchain transaction (Tx) upon determination that one or more conditions have been met. "Release of the transactions" may mean or comprise submitting to the blockchain network such that spending of transaction outputs can be performed. The condition(s) may be referenced from, or accessed using, metadata in the transaction(s). have been evaluated successfully. This can be done for the counterparty as well such that you create two transactions:

The method may comprise the step of using a blockchain transaction (Tx1) to transfer/spend a quantity or portion of cryptocurrency from a first user (party) A to a second user (party) B upon successful evaluation of one or more conditions. This may be referred to as the first rule set. The conditions may be rules that can be evaluated to produce a Boolean value or output. The conditions may be evaluated by a third party or user C. The conditions may comprise a rule that a request has been received from a second user before the quantity of cryptocurrency can be transferred.

The transfer of cryptocurrency may be performed using multi-signature (multi-sig) transaction type. This may be, for example, a 2-of-2 multisig transaction in Bitcoin protocol or a functional equivalent. The transaction output may require the signature of A and C in order for the output to be spent. Rules may be reference by a pointer contained within metadata in tout transaction.

The method may also comprise the step of using a blockchain transaction (Tx2) to transfer/spend a quantity or portion of cryptocurrency from the second user (party) B to the first user (party) A upon successful evaluation of one or more conditions. This may be referred to as the second rule set. The conditions may be rules that can be evaluated to produce a Boolean value or output. The conditions may comprise a rule that a request has been received from the first user before the quantity of cryptocurrency can be transferred.

The conditions may be evaluated by the third party or user C. The transfer of cryptocurrency may be performed using multi-signature (multi-sig) transaction type. This may be, for example, a 2-of-2 multi-sig transaction in Bitcoin protocol or a functional equivalent. The transaction output may require the signature of B and C in order for the output to be spent. Rules may be reference by a pointer contained within metadata in tout transaction.

The method may comprise the step of: checking that both the first and second conditions (rule sets) evaluate to true; if both evaluate to true, submitting both transactions to a blockchain network to perform the transfer (spending) of the first and second portions of cryptocurrency.

It should be noted that the mining process may result in one transaction occurring in an earlier block than the other. Also, it should be noted that the term "user" may not necessarily mean a human user. A user may be a computer or automated process which uses or forms part of the invention. The user may be, or may be associated with, a node in a network.

Additionally or alternatively, the invention may provide a method of recording multiple transactions between a multiple of users on a peer-to-peer distributed ledger (blockchain) including a first transaction (Tx) from a first user (A) to a second user (B) and a second transaction (Tx) from the second user (B) to the first user (A). The method may comprise: receiving a first request from a first node associated with the first user (A) to transfer a first quantity of cryptocurrency (B1) from the first user (A) to the second user (B) that is associated with the first transaction; receiving a second request from a second node associated with the second user (B) to transfer a second quantity of cryptocurrency (B2) from the second user (B) to the first user (A) that associated with the second transaction, wherein the first transaction is conditional on receiving the second request and/or the second transaction is conditional on receiving the first request; verifying the first request and second request, wherein the step of verifying the first request and second request comprises: determining both the conditional steps of receiving the first request and second request are satisfied. Based on verifying the first request and second request, the method further comprises: sending, over a communications network, a first data output (O1) to a peer-to-peer distributed ledger comprising: a first indication of a first transfer of the first quantity of cryptocurrency (B1) to the second user (B); and a second indication of a second transfer of the second quantity of cryptocurrency (B2) to the first user (A).

The first and second transactions are conditional on receiving corresponding request to transfer cryptocurrency associated with one another. Since the method includes verifying that both the first and second requests are made before the transfers are sent to be recorded on the peer-to-peer distributed ledger, the first user (A) and the second user (B) may have more confidence that the other user will fulfil their respective obligations in the first and second transactions. Furthermore, proof of a co-dependence of transactions between multiple users (A, B) may be provided by the first data output (O1) which includes and is representative of these co-dependent transactions. In particular the indications of both the first and second transfers are in the first data output (O1) of the same cryptocurrency Transaction record. This may assist in proving the first and second transactions are linked and co-dependent.

In the method, the first request may comprise a first notification that the first transaction is conditional on receiving the second request. In the method, the second request may comprise a second notification that the second transaction is conditional on receiving the first request.

The method may further comprise receiving a third notification, wherein the third notification specifies the first transaction is conditional on receiving the second request and the second transaction is conditional on receiving the first request.

In the method, the step of verifying the first request and the second request may further comprise authenticating the first request is from the first user (A) and the second request is from the second user (B).

In the method, the step of verifying the first request and the second request may further comprise determining authority to transfer the first quantity of cryptocurrency (B1) from the first user (A) and authority to transfer the second quantity of cryptocurrency (B2) from the second user (B).

The first data output (O1) may further comprise metadata (MD) associated with either one or both of the first transaction and the second transaction. The metadata (MD) associated with either one or both of the first transaction and the second transaction comprises a hash of one or more of: information related to the first and/or second transaction; a pointer to information related to the first and/or second transaction; and one or more identifiers related to the first user (A) and/or the second user (B).

The first quantity of cryptocurrency (B1) may be associated with a first token (T1) and/or the second quantity of cryptocurrency (B2) may be associated with a second token (T2). The method may further comprise: determining a first hash (H1) of a first redeem script (RS1), wherein the first redeem script (RS1) is based on: at least a first metadata (MD1) that includes information associated with the first token (T1); a second user public key (P1B) associated with the second user (B), wherein the second user public key (P1B) forms a cryptographic pair with a second user private key (V1B); and a trusted entity public key (P1T) associated with the trusted entity (TE), wherein the trusted entity public key (P1T) forms a cryptographic pair with a trusted entity private key (V1T), wherein the first data output (O1) further comprises the first hash (H1), wherein the first hash (H1) is associated with the first quantity of cryptocurrency (B1), to provide the first token (T1).

The method may further comprise determining a second hash (H2) of a second redeem script (RS2), wherein the second redeem script (RS2) is based on: at least a second metadata (MD2) that includes information associated with the second token (T2); a first user public key (P1A) associated with the first user (A), wherein the first user public key (P1A) forms a cryptographic pair with a first user private key (V1A); and a trusted entity public key (P1T) associated with the trusted entity (TE), wherein the trusted entity public key (P1T) forms a cryptographic pair with a trusted entity private key (V1T), wherein the first data output (O1) further comprises: the second hash (H2), wherein the second hash (H2) is associated with the second quantity of cryptocurrency (B2), to provide the second token (T2).

A computer-implemented method of confirming the first transaction and/or the second transaction based on the first data output (O1) to the peer-to-peer distributed ledger according to any one of the preceding claims, the method comprising: receiving a request to confirm the first transaction and/or the second transaction; determining the first data output (O1) corresponding to the first transfer of the first quantity of cryptocurrency (B1) associated with the first transaction and/or the second transfer of the second quantity of cryptocurrency (B2) associated with the second transaction; receiving, over the communications network, at least part of the first data output (O1) from the peer-to-peer distributed ledger; determining, from the first data output (O1), the first indication of the first transfer and/or the second indication of the second transfer; verifying that the first indication of the first transfer and/or the second indication of the second transfer corresponds to the first transaction and/or second transaction in the request; and sending an output indicative of the result of verifying.

The method may further comprise verifying, based on the first indication of the first transfer and the second indication of the second transfer, that both the conditional steps of receiving the first request and second request were satisfied; and sending an output indicative that the first transaction was conditional on receiving the second request and/or the second transaction was conditional on receiving the first request and that the conditional steps were satisfied.

The method may further comprise determining metadata associated with the first transaction and/or the second transaction, wherein the step of verifying further comprises verifying that the metadata corresponds to the first transaction and/or second transaction.

The method may further comprise: receiving and determining a verification hash of one or more of: information related to the first and/or second transaction; a pointer to information related to the first and/or second transaction; and one or more identifiers related to the first user (A) and/or second user (B); verifying the verification hash corresponds to the hash in metadata.

A computer program comprising machine-readable instructions to cause a processing device to implement any one of the methods as described above.

A device comprising a first processing device to perform any one of the methods described above.

A device for recording multiple transactions between a multiple of users on the peer-to-peer distributed ledger, including a first transaction from a first user (A) to a second user (B) and a second transaction from the second user (B) to the first user (A), wherein the device comprises: a processing device to: receive a first request from a first node associated with the first user (A) to transfer a first quantity of cryptocurrency (B1) from the first user (A) to the second user (B) that is associated with the first transaction; receive a second request from a second node associated with the second user (B) to transfer a second quantity of cryptocurrency (B2) from the second user (B) to the first user (A) that associated with the second transaction, wherein the first transaction is conditional on receiving the second request and/or the second transaction is conditional on receiving the first request; verify the first request and second request, wherein to verify the first request and second request comprises the processing device to determine both the first request and second request are received, wherein based on verifying the first request and second request, the processing device selectively sends, over a communications network, a first data output (O1) to a peer-to-peer distributed ledger comprising: a first indication of a first transfer of the first quantity of cryptocurrency (B1) to the second user (B); and a second indication of a second transfer of the second quantity of cryptocurrency B2) to the first user (A).

Any feature(s) described above in relation to one aspect or embodiment may be equally applicable to one or more other aspects or embodiments. For example, a feature described in relation to a method may also be applicable to a system of the invention.

BRIEF DESCRIPTION OF DRAWINGS

Examples of the present disclosure will be described with reference to.

DESCRIPTION OF EMBODIMENTS

Overview

The invention provides a method and system to facilitate multiple transactions between multiple users on a peer-to-peer distributed ledger 9 (i.e. a blockchain). This may or may not be the Bitcoin blockchain. In one embodiment, the invention is arranged such that a (trusted) third party is only authorised release one or more associated transactions once some conditions have been evaluated successfully. The conditions can be directly referenced from metadata in one or more of the transactions themselves. In summary, the invention may comprise the following steps:

Transaction 1 (Tx1) 1: A pays B with some conditions evaluated by C (effectively a 2 of 2 multi-sig of A plus C with a pointer to metadata rules) Transaction 2 (Tx2): B pays A with some conditions evaluated by C (effectively a 2 of 2 multi-sig B plus C with a pointer to metadata rules).

There may be the assumption that the conditions are the presence of the counter-party transaction so the rules in Txn 1 can never evaluate to true independently of the rules in Txn 2 doing the same. However, once both the rule sets evaluate to true, then both transactions can be released for spending simultaneously (even if the mining means that one may occur in an earlier block than the other).

Figure 1:
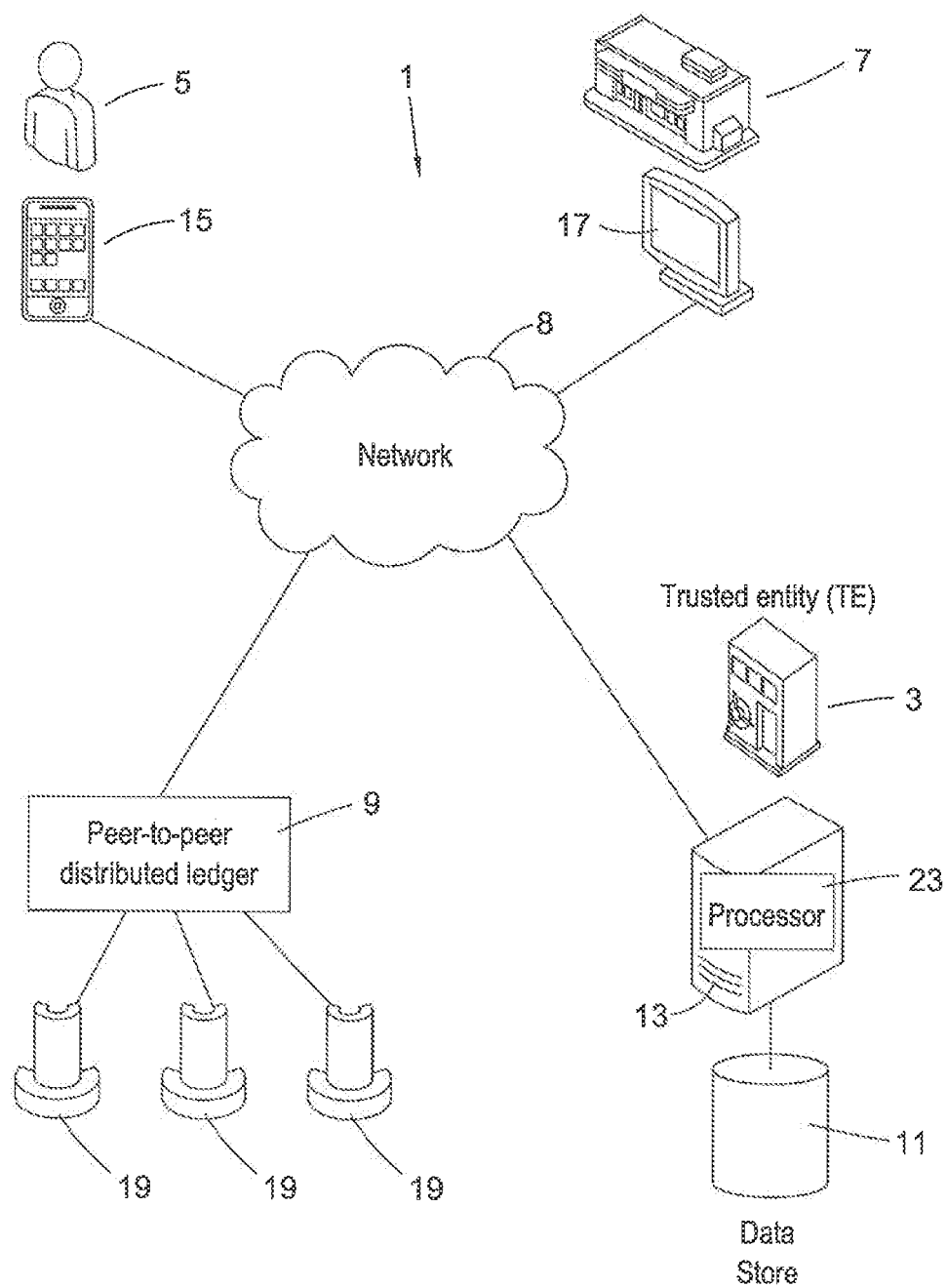
FIG. 1 is a schematic of an example system to record multiple transactions between a multiple of users on the peer-to-peer distributed ledger.

FIG. 1 illustrates a system 1 that includes a first user (A) 5 associated with a first node 15 and a second user (B) 7 associated with a second node 17. The first node 15 and second node 17 are in communication, over a communications network 8, with a third node 13 associated with a trusted entity (TE) 3.

The third node 13 associated with the trusted entity (TE) 3 is in communication, over a communications network 8, with a peer-to-peer distributed ledger 9 to record transactions. The peer-to-peer distributed ledger 9 may be associated with one or more processing devices 19 to receive and record transactions. An example of a peer-to-peer distributed ledger includes the Blockchain, which is a consensus-based ledger of transactions based on the bitcoin protocol. Thus the processing device 19 associated with the ledger may be processing devices used by, or associated with, "miners."

Figure 2:
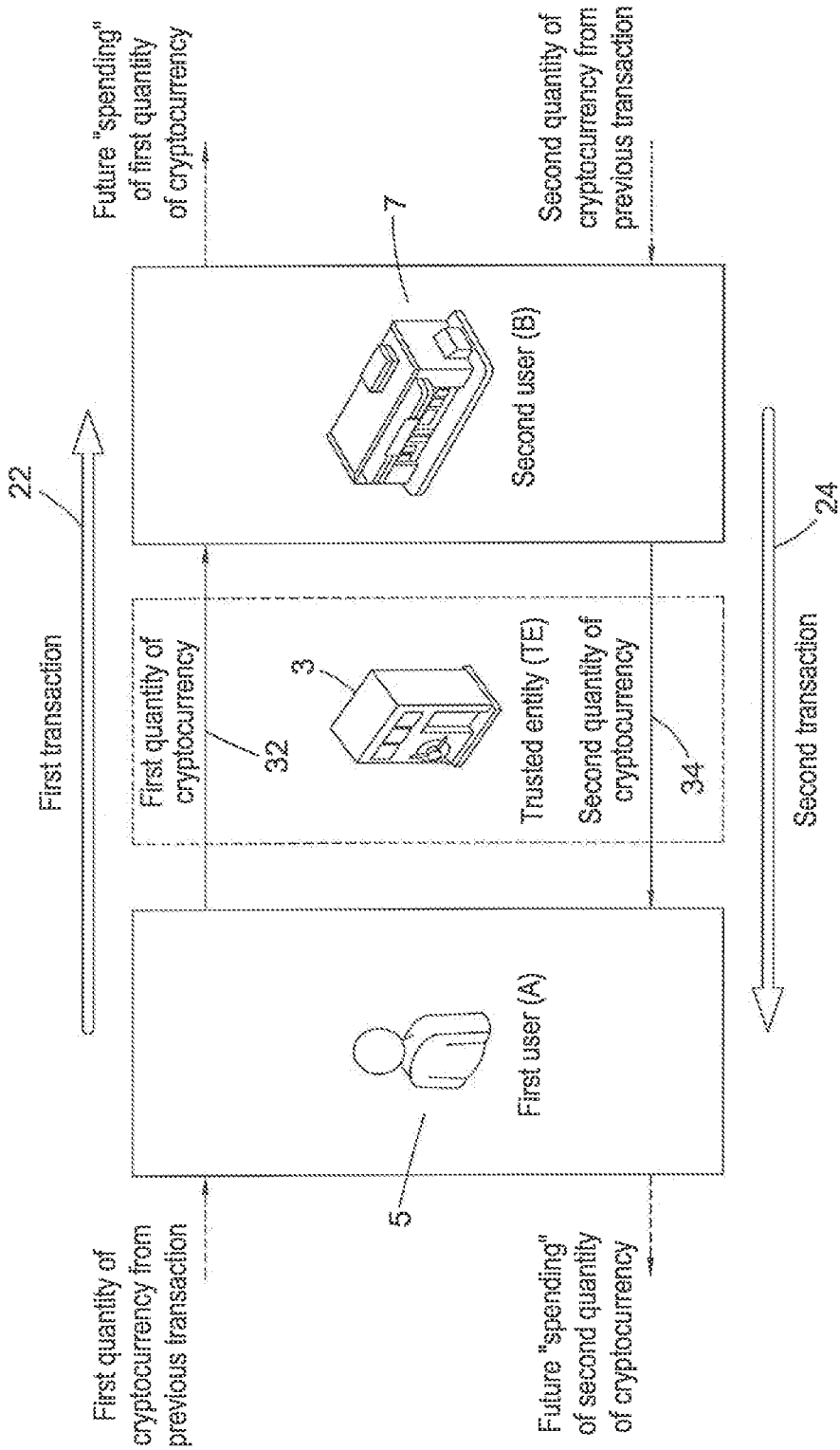
FIG. 2 is a diagram illustrating a first transaction from a first user to a second user and a second transaction from the second user to the first user.

Referring to FIG. 2, the first user (A) 5 and the second user (B) 7 may wish to participate in a bidirectional transaction. The bidirectional transaction includes a first transaction 22 from the first user (A) 5 to the second user (B) 7 and a second transaction 24 from the second user (B) 7 to the first user (A) 5. The first and second transactions 22, 24 may include transactions of cryptocurrency, tokenised cryptocurrency, fiat currency, tangible assets, intangible assets, representations ownership thereof, etc. To effect the first transaction 22, a first quantity (B1) of cryptocurrency is transferred 32 from the first user (A) 5 to the second user (B) 7. Similarly, to effect the second transaction 24 a second quantity (B2) of cryptocurrency is transferred 34 from the second user (B) 7 to the first user (A) 5. The first and/or second quantity of cryptocurrency may be the subject of the transaction itself (for example if the intention is to transfer cryptocurrency as payment). Alternatively the first and/or second quantity cryptocurrency may be representative of the transactions 22, 24 (for example, as a token of fiat currency, tangible assets, intangible assets, representations of possession or ownership thereof, etc).

Figure 3:
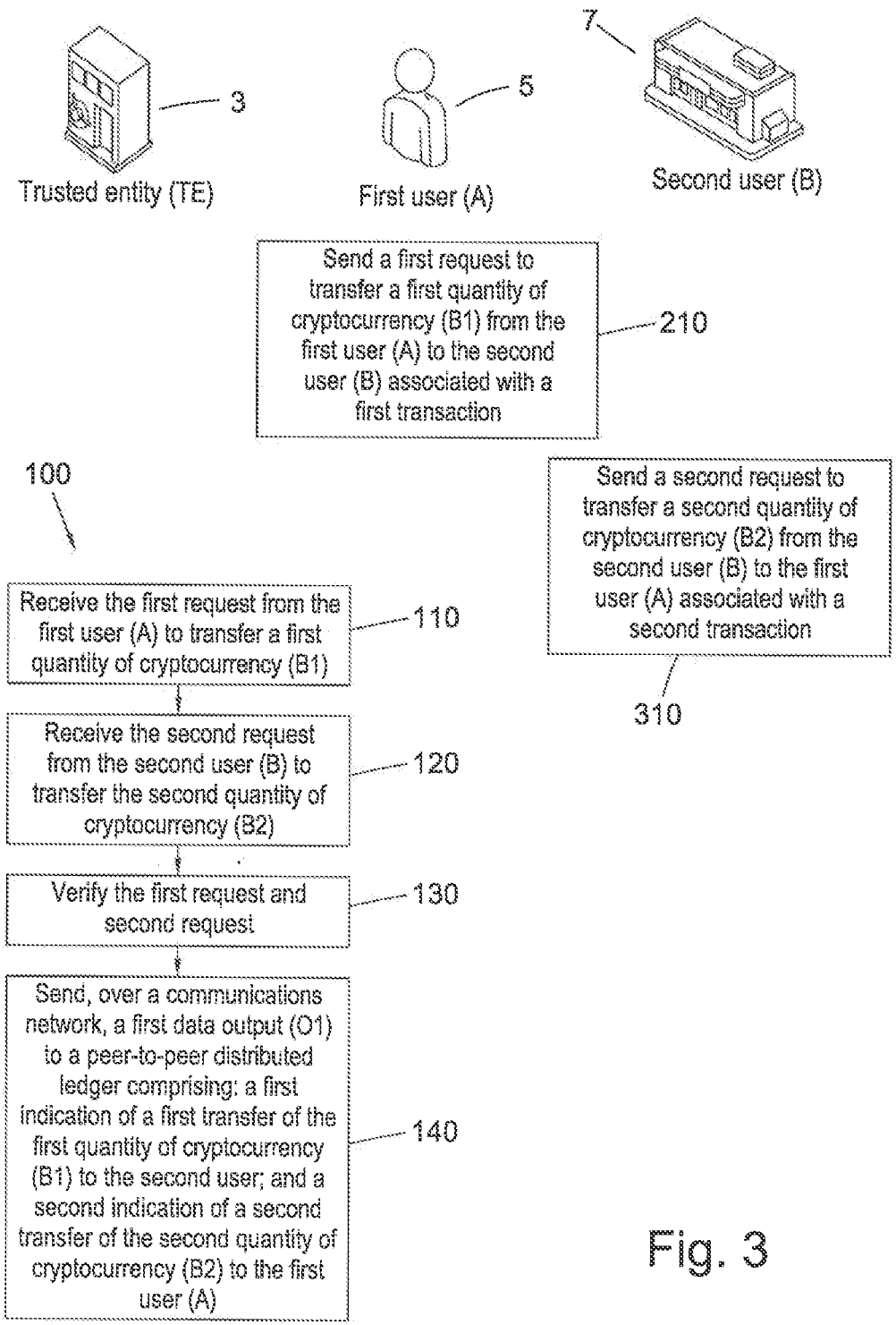
FIG. 3 is a flowchart of a computer-implemented method of recording multiple transactions between a multiple of users.

The first user (A) 5 may not trust the second user (B) 7 to fulfil the second user's (B) 7 side of the bidirectional transaction. Similarly, the second user (B) 7 may not trust the first user (A) 5. Therefore to give both users 5, 7 a higher degree of confidence, the trusted entity (TE) 3 is involved so that the first and second transactions are conditional on each other. Referring to FIG. 3, the method 100 performed by trusted entity (TE) includes verifying 130 that the trusted entity (TE) 3 has received both: (i) a first request 110 to transfer a first quantity of cryptocurrency (B1) from the first user (A) 5 to the second user (B) 7; and (ii) a second request 120 to transfer a second quantity of cryptocurrency (B2) from the second user (B) 7 to the first user (A) 5. A positive verification that both the first and second requests have been received is indicative of the bona fide intention of both the first and second users 5, 7. Therefore the third node 13 associated with the trusted entity (TE) 3 may then proceed to record the transfer of the first quantity of cryptocurrency (B1) and the second quantity of cryptocurrency (B2) by sending 140 a first data output (O1) to the peer-to-peer distributed ledger 9 which, in turn, provides a record of the first and second transactions.

One advantage of this system and method described herein may include greater confidence for the first and second user 5, 7 that obligations of the other party are likely to be fulfilled. Another advantage is that the first data output (O1) may be used as proof that the first and second transfers are codependent and linked to a bidirectional transaction. In particular, the indications of both the first and second transfers are in the first data output (O1) of the same cryptocurrency Transaction record.

This system 1 may also allow review and verification, at a later point in time, that the first and second transactions have occurred based on records recorded on the peer-to-peer distributed ledger 9. This may include verification that the transfer 32 of the first quantity of cryptocurrency (B1) (associated with the first transaction) was part of a bidirectional transaction linked with the transfer 34 of the second quantity of cryptocurrency (B2) (associated with the second transaction). This may be useful if there is a dispute as such verification may be proof of both party's intention and performance of their obligations. For example if the second user (B) 7 makes an accusation that the first user (A) did not pay for good or service, the first user (A) may be able to verify payment was made with reference to the record of the bidirectional transaction on the peer-to-peer distributed ledger that shows payment was made in return for that good or service. An example of reviewing and verifying transactions is shown in method 400 in FIG. 4 which will be described in further detail below.

Description of an Example of a Bidirectional Transaction

Agreeing to a Bidirectional Transaction

The first user (A) 5 and second user (B) 7 enters into an agreement whereby the first user (A) agrees to make a first transaction 22 to the second user (B) 7 in exchange for the first user (A) 5 receiving a second transaction 24 from the second user (B) 7. This agreement may be the result of negotiations, rounds of offers, and eventual acceptance by the first and second users 5, 7. In some examples, the agreement may be a contractual agreement as a result of an auction, sale of goods and services, etc. It is to be appreciated the bidirectional transaction may be applicable to a range of different transactions that include (but not limited to): real property, tangible assets, intangible assets, currency, financial instruments, contracts, insurance policies, shares, superannuation, employee remuneration, etc.

The first transaction 22 is associated with the first quantity of cryptocurrency (B1). In one example, the first user's agreed obligation may be to transfer cryptocurrency to the second user (B) 7 as a payment, and therefore the first transaction 22 is simply a transfer of the first quantity of cryptocurrency (B1) to fulfil that obligation. In other examples, the first user's (A) 5 agreed obligation may be something other than cryptocurrency in itself. For example, first transaction 22 may include transferring another asset such as an amount of fiat currency, a shareholding, a promise to pay, and other tangible and intangible assets and rights as described herein. These assets, as they are not cryptocurrency, may not in themselves be transferred by recording on the peer-to-peer distributed ledger. However, a quantity of cryptocurrency may be tokenised to represent such assets, and transfer of such "tokenised cryptocurrency" can be recorded on the peer-to-peer distributed ledger. Thus the first transaction 22 may be represented, and recorded, by the transfer of the associated first quantity of cryptocurrency (B1) from the first user (A) 5 to the second user (B) 7. Similarly, the second transaction 24 may be represented, and recorded, by the transfer of the associated second quantity of cryptocurrency (B2) from the second user (B) 7 to the first user (A) 5.

Selecting a Trusted Entity

Even if the first user (A) 5 and the second user (B) 7 agree to proceed with the respective first transaction 22 and second transaction 24, there may be mistrust between these users. For example, one user may have concern that the other user may not fulfil the other user's obligation and abscond with the user's assets. Thus the trusted entity (TE) 3, who is trusted by both the first user (A) 5 and the second user (B) 7, is involved where the trusted entity will only transfer 32 the first quantity of cryptocurrency (B1) on the condition that there is also a request to transfer 34 the second quantity of cryptocurrency (B2).

The trusted entity (TE) 3 may be a service provider trusted by both users. For example, the trusted entity may be a bank, another financial institution, a central bank, mint, company etc. In one example, the trusted entity may be a bank that manages the electronic wallets ("ewallet") of both the first user (A) 5 and the second user (B) 7. In other examples, the third party may be an entity that provides an escrow service.

Importantly, the trusted entity (TE) 3 is trusted directly by both users or alternatively both users implicitly trust the trusted entity (TE) 3 (for example, if the users are indemnified for loss caused by errors made by the trusted entity).

Sending a Request to Transfer Cryptocurrency to the Trusted Entity

The first user (A) 5, once satisfied with the trusted entity (TE) 3 may then send a first request to transfer 32 a first quantity of cryptocurrency (B1) from the first user (A) to the second user (B) 7 that is associated with the first transaction 22. In the example where the trusted entity (TE) 3 manages the ewallet of the first user (A) 5, this may include authorisation for the trusted entity (TE) 3 to use the first user's (A) 5 private keys to make the transfer 32 of the first quantity of cryptocurrency (B1) on their behalf. The first quantity of cryptocurrency may include part of a quantity of cryptocurrency in the first user's ewallet from a previous transaction.

The first request 210 may be sent from the first node 15 associated with the first user (A) 5 to the third node associated with the trusted entity (TE) 3.

In other examples, the first request 210 to transfer the first quantity of cryptocurrency (B1) may be sent indirectly to the trusted entity (TE) 3. For example, the first user (A) 5 may make a request to an entity managing of the first user's ewallet to transfer the first quantity of cryptocurrency (B1). The entity managing the first user's wallet may in turn send a corresponding request to the trusted entity (TE) 3 to effect the conditional transfer of cryptocurrency.

The first request 210 to transfer 32 the first quantity of cryptocurrency (B1) may include, in the request, an explicit first notification that the first transaction (including the first transfer 32) should only proceed if there is a corresponding second request to transfer 34 the second quantity of cryptocurrency (B2). The second request 210 may similarly include a second notification requiring that the second transaction (including the second transfer 34) to only proceed if the first request was made.

In alternative examples, the first request 210 does not include an explicit condition and the trusted entity (TE) 3 may determine with other ways that the first transaction (including the first transfer 32) should be conditional on the second transaction (including the second transfer 34). For example, a separate message may be sent to the trusted entity that the first 32 and second 34 transfers are conditional on each other. For example, another node may be associated with an auctioneer that facilitated the agreement between the first user (A) 5 and the second user (B) 7. The other node may then notify the trusted entity (TE) 3 with a third notification that the first and second transactions (including the transfer of cryptocurrency between the first user (A) 5 and the second user (B) 7) are conditional on each other before the actual transfer is performed. In some examples, such conditions may be stored in a data store 11 associated with the third node 13 and retrieved by the third node 13 as required.

The second node 17, associated with the second user (B) 7, also sends 310 a second request to transfer 34 a second quantity of cryptocurrency (B2) from the second user (B) 7 to the first user (A) 5, where the transfer 34 is associated with the second transaction 24. This second request may be made in the same or similar ways as discussed above for the first request.

Performing the Method 100 of Recording the Multiple Transactions

The trusted entity (TE) 3 performs the method 100 of recording the multiple transactions as described below with reference to FIGS. 2 and 3.

The method 100 includes receiving 110 the first request to transfer 32 the first quantity of cryptocurrency (B1) and receiving 120 the second request to transfer 34 the second quantity of cryptocurrency (B2) that was sent in steps 210 and 310 described above.

The method 100 further includes verifying 130 the first and second requests. The step of verifying 130 includes determining that both the conditional steps of receiving 110, 120 the first request and second request are satisfied. As discussed above, the conditions may be include in either one or both of the first and second request, and/or determined by other ways such as receiving the conditions from another party or from the data store 11.

In a further example, the step of verifying the first request and the second request also comprises authenticating that the first request is from the first user (A) 5 and/or the second request is from the second user (B) 7. This may include the trusted entity (TE) 3, or an authenticating agent, that authenticates that the requests are made by the first and second users 5, 7 and/or their respective associated first and second nodes 15/17.

In another example, the step of verifying the first request and the second request also comprises determining authority to transfer 32 the first quantity of cryptocurrency (B1) from the first user (A) 5 and authority to transfer 34 the second quantity of cryptocurrency (B2) from the second user (B) 7. This may be useful in cases where there are restrictions on the transfer of assets. For example, there may be circumstances where the user 5, 7 may not have authority to freely transfer assets. This may include a mortgage over the asset. Therefore the trusted entity (TE) may, in the step of verifying 130, determine whether the transfer of cryptocurrency should go ahead. In one example, determining authority to transfer may include the trusted entity (TE) sending a query to a property securities register to determine if there are restrictions on the transfer or one or more assets that is the subject of the first transaction 22 and second transaction 24.

Based on verification of the first and second requests at step 130, the method 100 may proceed to record the transfer 32, 34 of the first and second quantities of cryptocurrency. This can be achieved by sending 140, over the communications network 8, a first data output (O1) to a peer-to-peer distributed ledger 9. The first data output (O1) includes: (i) a first indication of a first transfer 32 of the first quantity of cryptocurrency (B1) to the second user (B) 7; and (ii) a second indication of a second transfer 34 of the second quantity of cryptocurrency (B2) to the first user (A) 5.

The first data output (O1) on the peer-to-peer distributed ledger 9 achieves the following.

Firstly, this records the transfer 32 the transfer of the first quantity of cryptocurrency (B1) to the second user (B) 7. The first quantity of cryptocurrency (B1) represents the associated first transaction 22 from the first user (A) 5 to the second user (B) 7. The value of this first quantity of cryptocurrency (B1) to the second user (B) 7 may include: (i) the nominal cryptocurrency value of the first quantity of cryptocurrency (B1); and/or (ii) other associated value such as a "token value" or the "asset" that the first quantity of cryptocurrency (B1) represents. The second user (B) 7 may, in the future, spend the first quantity of cryptocurrency (B1) for future transactions.

Secondly, this records the transfer 34 of the second quantity of cryptocurrency (B2) to the first user (A) 5. This may be used by the first user (A) 5 in a similar manner to how the second user (B) 7 uses the received first quantity of cryptocurrency (B1) described above.

Thirdly, the first data output (O1) becomes a permanent record on the peer-to-peer distributed ledger that can be used to confirm that the bidirectional transaction had occurred. Furthermore, since the record is permanent and the indications of the multiple transfers that are part of the bidirectional transactions are in the same first data output (O1), this may give the users confidence in the bidirectional transactions. This will be described in further detail below.

Method of Confirming the First Transaction 22 and/or the Second Transaction 24

Figure 4:
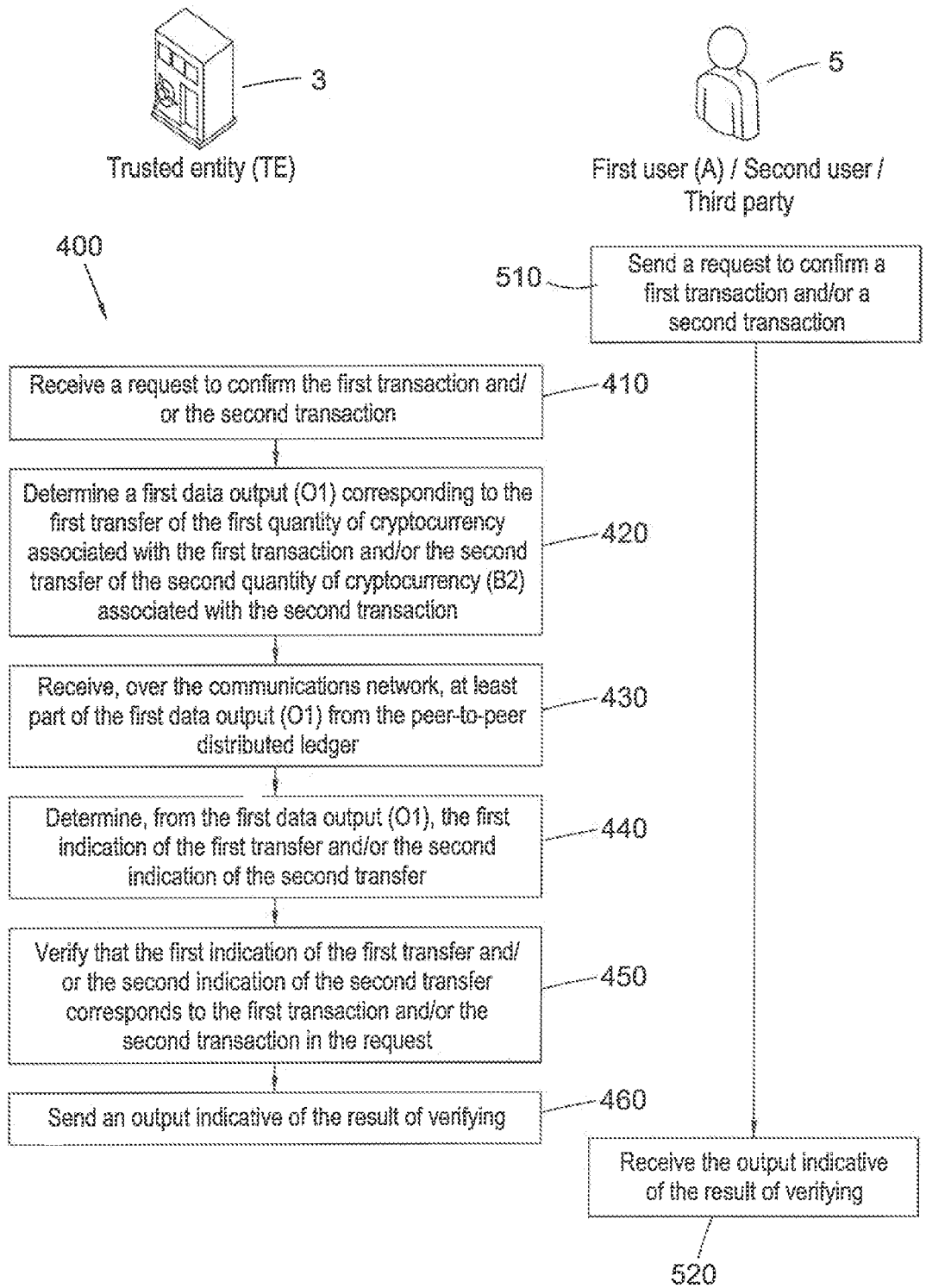
FIG. 4 is a flowchart of a computer-implemented method of confirming the first transaction and/or the second transaction.

A method 400 of confirming the first transaction 22 and/or the second transaction 24 will now be described with reference to FIG. 4.

In some circumstances, for example during an audit or a dispute between the first user (A) 5 and second user (B) 7, it is desirable to confirm the record of the first transaction 22 and/or the second transaction 24. This may include the first user (A) 5, the second user (B) 7, or another party (such as an auditor, legal representative, or arbitrator) sending 510 a request to confirm the first transaction 22 and/or the second transaction 24. It is to be appreciated that the request 510 may be framed in various ways including, but not limited to, reference to the first and/or second transaction 22, 24, the first and/or second transfer 32, 34 of cryptocurrency, the transactions made by the first or second user 5, 7, etc. It is to be appreciated that sending 510 the request may also include sending a request to confirm that both the first transaction 22 and the second transaction 24 were made in an associated bidirectional transaction.

The method 400 includes the trusted entity (TE) 3, or another entity, receiving 410 the request to confirm the first transaction 22 and/or the second transaction 24.

The method 400 then includes determining 420 a first data output (O1) corresponding to: (i) the first transfer 32 of the first quantity of cryptocurrency (B1) associated with the first transaction 22; and/or (ii) the second transfer 34 of the second quantity of cryptocurrency (B2) associated with the second transaction 24. In one example, the step of determining 420 may include receiving, from data store 11 or other node, records that allow determination of the corresponding first data output (O1) that is associated with the first transfer 32 and/or second transfer 34. For example, such records may include a table that maps the first data output to the first transfer 32 and second transfer 34, transfers associated with the first user (A) 5, and/or transfers associated with the second user (B) 7, etc. In other examples, this may include determining, based on records from the peer-to-peer distributed ledger, transactions that have involved the first user (A) 5 and/or second user (B) 7 to identify the first data output (O1).

The next step includes receiving 430, over the communications network 8, at least part of the first data output (O1) from the peer-to-peer distributed ledger 9. In some examples, the first data output (O1) or record thereof is stored in the data store 11. However receiving at least part of the first data output (O1) from the peer-to-peer distributed ledger 9 allows verification that the first data output (O1) was, in fact, recorded.

The next step includes determining 440 from the first data output (O1) the first indication of the first transfer 32 and/or the second indication of the second transfer 34.

The method 400 further includes verifying 450 that the first indication of the first transfer 32 and/or the second indication of the second transfer 34 correspond to the queried first transaction 22 and/or second transaction in the received request. For example, this may include comparing the first indication of the first transfer 32 to an expected transfer of cryptocurrency with the first transaction 22 (and/or similarly comparing the second indication of the second transfer 34 and the queried second transaction 24).

The method 400 may include sending 460 an output indicative of the result of the step of verifying 450. The output may be received 520 by the first user (A) 5, second user (B) 7), or other entity or node that had queried or required confirmation of the first and/or second transaction 22, 24.

In some examples, the method 400 also includes verifying that the conditional requirements for the first transfer 32 and the second transfer 34. Thus the method 400 may further include verifying, based on the first indication of the first transfer 32 and the second indication of the second transfer 34, that both the conditional steps of receiving the first request 110 and the second request 120 were satisfied. This verification step may also include querying records, such as from data store 11, that the first and second transfer 32, 34 were conditional on each other. The method 400 may also include sending an output indicative that the first transaction 22 was conditional on receiving 120 the second request and/or the second transaction 24 was conditional on receiving 110 the first request and that the conditional steps were satisfied.

Variations

Metadata Indicative of the Bidirectional Transaction in the Data Output

In some further variations, information in relation to the first transaction 22 and/or the second transaction 24 may be included in the first data output (O1) that is recorded on the peer-to-peer distributed ledger 9. Inclusion of such information may be useful for verifying the first and second transaction 22, 24 (and the corresponding first and second transfer 32, 34).

One method of including such information is to include it in metadata in the first data output (O1), that is associated with either or both of the first transaction 22 and the second transaction 24. Such information may include, but not limited to: terms and conditions related to the first and/or second transaction; a pointer to information related to the first and/or second transaction; and one or more identifiers related to the first user (A) 5 and/or the second user (B) 7.

In some instances, the information may be of substantial length and/or include confidential information. Therefore in some examples the information, or at least part of the information, may be hashed which can be advantageous as the hashed length may be shorter as well as functioning to conceal the information. At the same time, the hashed information is recorded permanently on the peer-to-peer distributed ledger 9 such that the record can be used to verify the information. For example, an entity wishing to verify information can hash the queried information which is then compared to the hash recorded on the peer-to-peer distributed ledger 9.

Metadata in the Redeem Script for a Pay-to-Script-Hash Transaction

In the peer-to-peer method of the bitcoin protocol, metadata may be included in the output script. An example of providing metadata in a first data output will now be described with reference to a pay-to-script-hash transaction. In a standard pay-to-script hash method of the bitcoin protocol, the output script, or redeem script, may include the form:

<NumSigs PubK1 PubK2 . . . PubK15 NumKeys
OP_CHECKMULTISIG> where NumSigs is the number "m" of valid signatures required to satisfy the redeem script to unlock the transaction; PubK1, PubK2 . . . PubK15 are the public keys that correspond to signatures that unlock the transaction (up to a maximum of 15 public keys) and NumKeys is the number "n" of public keys.

To redeem the above redeem script, at least a number "m" of signatures corresponding to the public keys are required. In some examples, the order of the public keys is important and the number "m" out of "n" signatures for signing must be done in sequence. For example, consider where "m" is 2 and "n" is 15. If there are two signatures are available for use, Sig1 (corresponding to PubK1) and Sig 15 (corresponding to PubK15), the redeem script must be signed by Sig1 first followed by Sig15.

Metadata may be embedded in the redeem script in one or more of the 15 places available for the public keys in the redeem script. For example, the redeem script may take the form of:

<NumSigs Metadata1 Metadata2 . . . PubK1
PubK2 . . . NumKeys OP_CHECKMULTISIG> where Metadata1 and Metadata2 each include metadata that takes the place of a public key in the redeem script and PubK1 and PubK2 are public keys.

By inserting metadata that is associated to the transfer of cryptocurrency, for example information associated with the first and second transaction 22, 24, the hash of the information will be included in the peer-to-peer distributed ledger 9 as a permanent record.

Therefore the method 400 of confirming the first transaction 22 and/or second transaction 24 may further include determining metadata that would correspond with the first transaction and/or the second transaction. For example, this may include retrieving information from a data store 11, first node 15, second node 17, third node 13 or other nodes relevant to the first and/or second transaction 22, 24. This information may be used to verify metadata that was associated with the first and/or second transaction 22, 24, and in particular metadata that may have been in the first data output (O1) recorded on the peer-to-peer distributed ledger. If the metadata was hashed in the first data output (O1), verifying may include hashing the above mentioned information for comparison with the hashed metadata.

Tokenised Cryptocurrency

The first transaction 22 and/or second transaction 24 may involve the intention to transfer (tangible and intangible) assets that are not strictly cryptocurrency (such as the first and second quantities of cryptocurrency). Instead, the intention can include the intention to transfer assets. Therefore either one or both of the first transfer 32 and second transfer 34 of cryptocurrency may be performed using "tokenised cryptocurrency" such that there is a transfer the "token" representing such assets and rights. Amongst other things, tokens may also represent transferable contract conferring specified rights upon the holder to be redeemed for fiat currency, goods or services, real property right, etc.

In the method 100, the first quantity of cryptocurrency (B1) may be associated with a first token (T1) for the first transaction 22 and/or the second quantity of cryptocurrency (B2) may be associated with a second token (T2).

Figure 5:
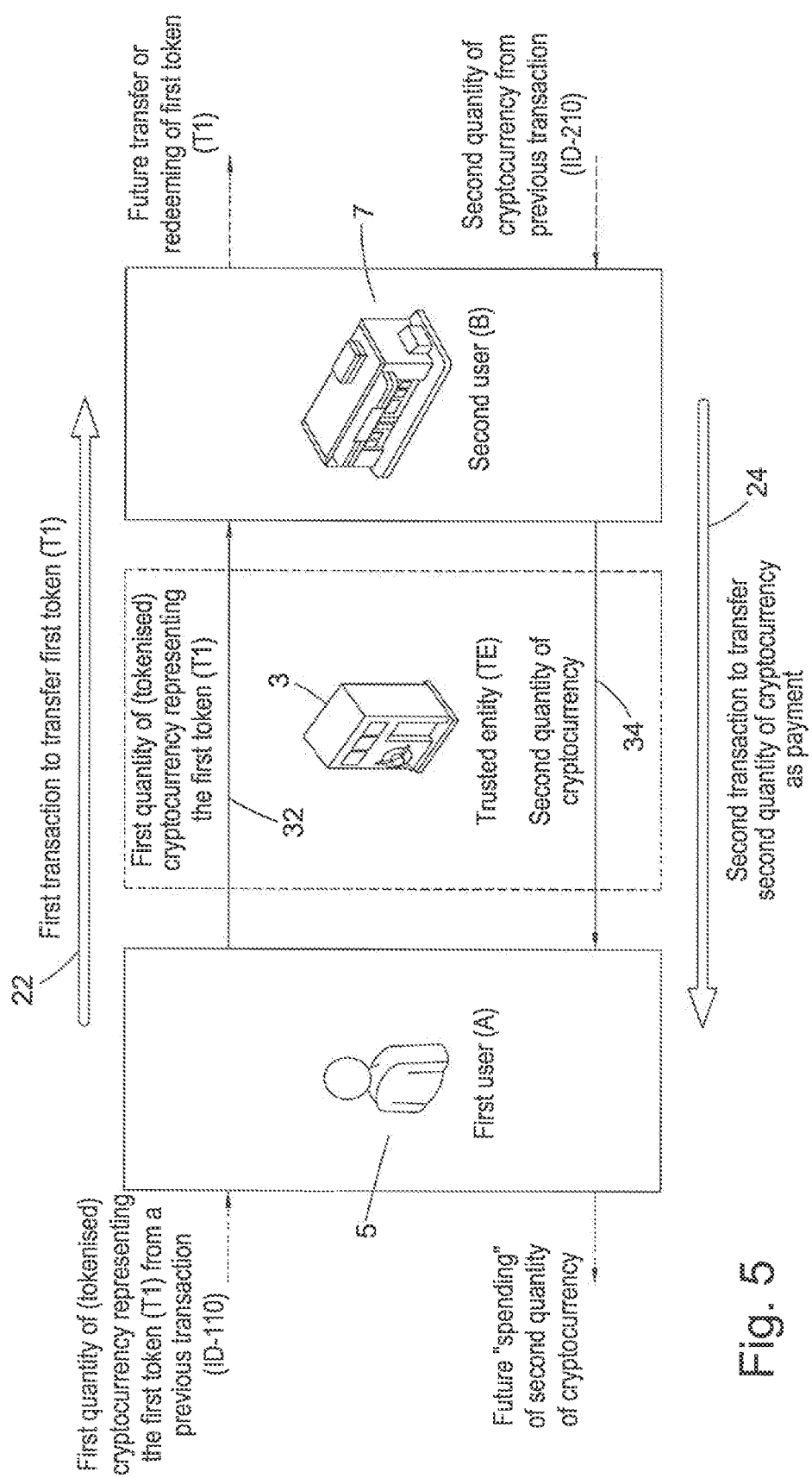
FIG. 5 is a diagram illustrating a first transaction from the first user to a second user, where the first transaction includes a first token, and a second transaction from the second user to the first user, where the second transaction includes a payment of cryptocurrency.

An example of a bidirectional transaction recorded on a cryptocurrency Transaction (ID-600) involving tokens will now be described with reference to Table 1 (where for brevity the miner's fee is not shown) and FIG. 5. This involves a first transaction 22 that includes the transfer of a first quantity of cryptocurrency (B1) that is associated with a first token (T1). In particular, where the first user (A) 5 has the first token (T1) and intends to transfer the first token (T1) to the second user (B) 7. The other side of this bidirectional transaction is the second user (B) 7 transferring the second quantity of cryptocurrency (B2) to the first user (A) 5. In this example, the second quantity of cryptocurrency (B2) is not tokenised and represents payment by the second user (B) 7 for the first token (T1).

TABLE 1

| | |
|---|---|
| ID-600 | Transaction-ID |
| Version number | Version number |
| 2 | Number of inputs |
| ID-110 | Previous TransOutput |
| IDX-00 | Prev TransOutput index |
| Script length | Script length |
| Sig-V1A Sig-V1T <2 TokenMetadata P1A P1T 3 OP_CHECKMULTISIG> | ScriptSig |
| 0000 0000 0000 0001 | Sequence number |
| ID-210 | Previous TransOutput |
| IDX-00 | Prev TransOutput index |
| Script length | Script length |
| Sig-V1B < P1B > | ScriptSig |
| 0000 0000 0000 0010 | Sequence number |
| 2 | Number of outputs |
| 2,000 | Output value |
| Output script length | Output script length |
| OP_HASH160 <redeem-script-hash> OP_EQUAL | Output script |
| 10,000 | Output value |
| Output script length | Output script length |
| OP_DUP OP_HASH160 < P1A hash> OP_EQUALVERIFY OP_CHECKSIG | Output script |
| LockTime | LockTime |

The Inputs

Lines 4 to 8 of Table 1 represent the input of the first quantity of cryptocurrency (B1) that is tokenised. This first quantity of cryptocurrency (B1) was the result of a previous transaction (ID-110) that transferred the first token (T1) to the benefit of the first user (A) 5 and therefore the previous transaction output script included the first user's public key (P1A). Accordingly, to unlock this previous output the script must be signed with the first user's private key (V1A). In this example, this redeem script includes a MULTISIG that also requires the trusted entity (TE) 3 to sign with the trusted entity private key (V1T) to prevent inadvertent spending (although it is to be appreciated in some other variations that this may not be required). Line 7 of Table 1 shows that the unlocking script includes "TokenMetadata" in the redeem script. The TokenMetadata includes information so that this first quantity of cryptocurrency (B1) can be recognised as the first token (T1). Finally, line 8 of Table 1 indicates that this first quantity of cryptocurrency (B1) will be the first output in this bidirectional transaction (ID-600).

Lines 9 to 13 of Table 1 represent the input of the second quantity of cryptocurrency (B2) that is untokenised. This second quantity of cryptocurrency (B2) was the result of a previous transaction (ID-210) that transferred this cryptocurrency to the benefit of the second user (B) 7 and therefore the previous transaction output script included the second user's public key (P1B). Accordingly, to unlock this previous output the script requires signing with the second user's private key (V1B). Finally, line 13 of Table 1 indicates that this second quantity of cryptocurrency will be the second output in this bidirectional transaction (ID-600).

The Outputs

Lines 15 to 17 of Table 1 represents the first output of this bidirectional transaction (ID-600), which in this case is representative of the first token (T1) transferred to the second user (B) 7. Line 15 shows the output value, which is the quantity of the first quantity of cryptocurrency (B1). Line 17 shows the output script, which includes a "<redeem-script-hash>" used in pay-to-script-hash.

The "<redeem-script-hash>" is the hash of a redeem script. In this example, this is a first redeem script (RS1) in the form of:

<2 TokenMetadata P1B P1T 3 OP_CHECKMULTI-SIG>

The first redeem script (RS1) includes "TokenMetadata" which is metadata in one of the fields of the MULTISIG so that this first quantity of cryptocurrency (B1) can continue to be recognised as the first token (T1). Since this first token (T1) has been transferred to the benefit of second user (B) 7, this first quantity of cryptocurrency (B1) is locked such that the first redeem script (RS1) includes the second user public key (P1B) and thus requires the second user private key (V1B) for unlocking. In this example, the redeem script also includes the trusted entity public key (P1T) and thus requires the trusted entity private key (V1T) for unlocking. It is to be appreciated that some other variations may not involve the trusted entity (TE) 3 in future spending of the first quantity of cryptocurrency (B1) and for such cases it is may not be necessary to include the trusted entity public key (P1T) in the first redeem script (RS1).

The above first redeem script (RS1) is then hashed to determine a first hash (H1) which is sent to be recorded on the peer-to-peer distributed ledger 9.

In future transactions of the first quantity of cryptocurrency (B1), such as when the second user (B) 7 wishes to transfer or redeem the first token (T1), the script to unlock the first quantity of cryptocurrency (B1) (e.g. the input ScriptSig of the future transaction) may be in the form:

Sig-V1B Sig-V1T<2 TokenMetadata P1B P1T 3 OP_CHECKMULTISIG>

Lines 18 to 20 of Table 2 represent the second output of this bidirectional transaction (ID-600), which in this case is the second quantity of cryptocurrency (B2) transferred to the first user (A) 5. This second quantity of cryptocurrency (B2) has a value of "10,000" as indicated at line 18. Since this second quantity of cryptocurrency (B2) is not tokenised, the first user (A) 5 should be free to spend this as they see fit. Referring to line 20, the output script indicates the second quantity of cryptocurrency (B2) is locked with the first user public key (P1A), which can be unlocked by the first user private key (V1A) as required.

These outputs are then recorded, with the first data output (O1), on the peer-to-peer distributed ledger 9. In particular, the first indication of the first data output (O1) includes the first hash (H1) (which is based on the result of the output script at line 17 of Table 1) that is associated with the first quantity of cryptocurrency (B1) that provides the first token (T1). The first output (O1) also includes a second indication that is associated with the second quantity of cryptocurrency (B2) (where the second indication is based on the result of the output script at line 20 of Table 1).

The above example described the first quantity of cryptocurrency (B1) that is tokenised. It is to be appreciated that the second quantity of cryptocurrency (B2), in some examples, could also be tokenised and therefore the above method could also apply so that the second quantity of cryptocurrency (B2) can provide a second token (T2). The second token (T2) can be similarly transferred and the result of which, including a second hash (H2) of a second redeem script (RS2), recorded on the peer-to-peer distributed ledger 9.

Although the above examples describe two user (5, 7) and two respective transactions (22, 24), it is to be appreciated that variations of the method may be implemented with additional users and additional transactions. For example, an additional third user may be involved whereby the third user and the first user (A) 5 agree to have third and fourth transactions between each other. For example, the first user (A) 5 may be a retail store and the second and third users may be customers.

Processing Device

As noted above, the first user (A) 5, second user (B) 7 and trusted entity (TE) 3 may be associated with respective first node 15, second node 17 and third node 13. The first node 15, second node 17 and third node 13 may be an electronic device, such as a computer, tablet computer, mobile communication device, computer server, computer terminal, etc. Such an electronic device may include a processing device 23, a data store 11 and a user interface. Examples of a user interface include a keyboard, mouse, monitor, touchscreen display, etc. The peer-to-peer distributed ledger 9 may also be associated with multiple processing devices 19.

Figure 6:
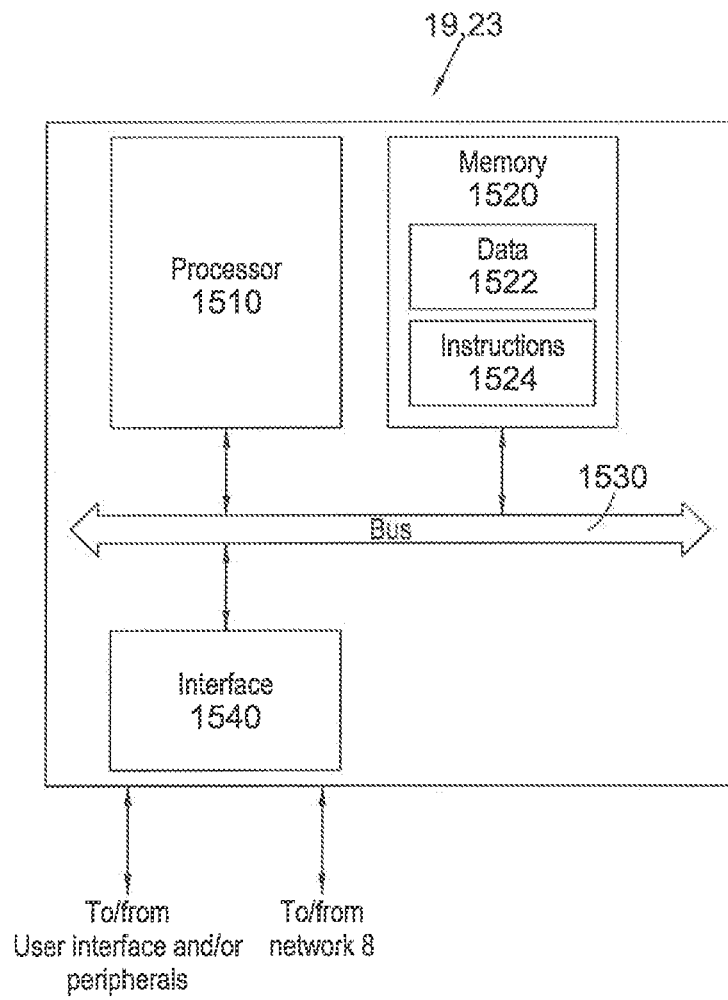
FIG. 6 illustrates a schematic example of a processing device.

FIG. 6 illustrates an example of a processing device 19, 23. The processing device 19, 23 includes a processor 1510, a memory 1520 and an interface device 1540 that communicate with each other via a bus 1530. The memory 1520 stores instructions and data for implementing the method 100, 400 described above, and the processor 1510 performs the instructions (such as a computer program) from the memory 1520 to implement the methods 100, 400. The interface device 1540 may include a communications module that facilitates communication with the communications network 8 and, in some examples, with the user interface and peripherals such as data store 11. It should be noted that although the processing device 1510 may be independent network elements, the processing device 1510 may also be part of another network element. Further, some functions performed by the processing device 19, 23 may be distributed between multiple network elements. For example, the trusted entity (TE) 3 may be associated with multiple processing devices 23 to perform method 100, 400 in a secure local area network associated with the trusted entity (TE) 3.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method comprising:
receiving, at a third node associated with a trusted entity (TE), a first request from a first node associated with a first user (A) to transfer a first quantity of cryptocurrency (B1) from the first user (A) to a second user (B), wherein the first quantity of cryptocurrency (B1) is associated with a first token (T1);
receiving, at the third node, a second request from a second node associated with the second user (B) to transfer a second quantity of cryptocurrency (B2) from the second user (B) to the first user (A);
verifying, by the third node, that both the first request and the second request have been received;
generating, by the third node, a first redeem script (RS1) to lock the first quantity of cryptocurrency (B1) in a first multi-signature transaction, wherein the first redeem script (RS1) includes at least first metadata (MD 1) identifying the first token (T1), a second user public key (P1B) associated with the second user (B) and forming a cryptographic pair with a second user private key (V1B), and a trusted entity public key (PIT) associated with the trusted entity (TE) and forming a cryptographic pair with a trusted entity private key (V1T), and wherein the first redeem script (RS1 is configured to grant access to the first quantity of cryptocurrency (B1) to the second user (B) responsive to unlocking the first multi-signature transaction by providing signatures corresponding to the second user public key (PIB) and the trusted entity public key (PIT) in a predefined sequence order;
generating, by the third node, a second redeem script (RS2) to lock the second quantity of cryptocurrency (B2) in a second multi-signature transaction, wherein the second redeem script (RS2) includes second metadata (MD2) identifying the second token (T2), a first user public key (P1A) associated with the first user (A) and forming a cryptographic pair with a first user private key (VIA), and the trusted entity public key (PIT), and wherein the second redeem script (RS2) is configured to grant access to the second quantity of cryptocurrency (B2) to the first user (A) responsive to unlocking the second multi-signature transaction by providing signatures corresponding to the first user public key (P1A) and the trusted entity public key (PIT) in the predefined sequence order;
determining, by the third node, a first hash (H1) of the first redeem script (RS1) for inclusion in a first output script to lock the first quantity of cryptocurrency (B1); and
determining, by the third node, a second hash (H2) of the second redeem script (RS2) for inclusion in a second output script to lock the second quantity of cryptocurrency (B2); and
sending, by the third node, over a communications network, a first data output (O1) to a blockchain network, the first data output (O1) comprising:
a first indication of a transfer of the first quantity of cryptocurrency (B1) to the second user (B), locked by the first output script including the first hash (H1);
a second indication of a transfer of the second quantity of cryptocurrency (B2) to the first user (A), locked by the second output script including the second hash (H2).

2. The method according to claim 1, wherein verifying that both the first request and the second request have been received comprises evaluating one or more rules to produce a Boolean value or output indicating whether both requests are received.

3. The method according to claim 1, wherein the first request comprises a notification that the first transaction is permitted to proceed if the second request is verified as received.

4. The method according to claim 1, wherein the second request comprises a notification that the second transaction is permitted to proceed if the first request is verified as received.

5. The method according to claim 1, further comprising: receiving a third notification, wherein the third notification specifies that the third node permits the first transaction to proceed if the second request is verified as received and permits the second transaction to proceed if the first request is verified as received.

6. The method according to claim 1, wherein the step of verifying the first request and the second request further comprises authenticating the first request is from the first user (A) and the second request is from the second user (B).

7. The method according to claim 1, wherein the step of verifying the first request and the second request further comprises determining authority to transfer the first quantity of cryptocurrency (B1) from the first user (A) and authority to transfer the second quantity of cryptocurrency (B2) from the second user (B).

8. The method according to claim 1, wherein the first data output (O1) further comprises metadata (MD) associated with either one or both of the first transaction and the second transaction.

9. The method according to claim 8, wherein the metadata (MD) associated with either one or both of the first transaction and the second transaction comprises a hash of one or more of: information related to the first transaction and/or the second transaction; a pointer to information related to the first transaction and/or the second transaction; and one or more identifiers related to the first user (A) and/or the second user (B).

10. A non-transitory computer readable storage medium comprising machine-readable instructions, that when executed by a processing device corresponding to the third node associated with the trusted entity (TE), cause the processing device to implement the method according to claim 1.

11. A device corresponding to the third node associated with the trusted entity (TE), the device including a processor and memory storing computer readable instructions that, when executed by the processor, cause the processor to perform the method of claim 1.

12. A device for recording multiple transactions between a multiple of users on a blockchain, including a first transaction from a first user (A) to a second user (B) and a second transaction from the second user (B) to the first user (A), wherein the device comprises:
a processing device; and
a memory storing instructions that, when executed by the processing device, cause the processing device to:
receive a first request from a first node associated with the first user (A) to transfer a first quantity of cryptocurrency (B1) from the first user (A) to the second user (B), wherein the first quantity of cryptocurrency (B1) is associated with a first token (T);
receive a second request from a second node associated with the second user (B) to transfer a second quantity of cryptocurrency (B2) from the second user (B) to the first user (A), wherein the second quantity of cryptocurrency (B2) is associated with a second token (T2);

verify that both the first request and second request have been received;

generate a first redeem script (RS1) to lock the first quantity of cryptocurrency (B1) in a first multi-signature transaction, wherein the first redeem script (RS1) includes first metadata (MD1) identifying the first token (T1), a second user public key (P1B) associated with the second user (B) and forming a cryptographic pair with a second user private key (V1B), and a trusted entity public key (PIT) associated with the trusted entity (TE) and forming a cryptographic pair with a trusted entity private key (VIT), the first redeem script (RS1) being configured to grant access to the first quantity of cryptocurrency (B1) to the second user (B) responsive to unlocking the first multi-signature transaction by providing signatures corresponding to the second user public key (P1B) and the trusted entity public key (PIT) in a predefined sequence order;

generate a second redeem script (RS2) to lock the second quantity of cryptocurrency (B2) in a second multi-signature transaction, wherein the second redeem script (RS2) includes second metadata (MD2) identifying the second token (T2), a first user public key (P1A) associated with the first user (A) and forming a cryptographic pair with a first user private key (V1A), and the trusted entity public key (PIT), the second redeem script (RS2) being configured to grant access to the second quantity of cryptocurrency (B2) to the first user (A) responsive to unlocking the second multi-signature transaction by providing signatures corresponding to the first user public key (P1A) and the trusted entity public key (PIT) in the predefined sequence order;

determine a first hash (H1) of a first redeem script (RS1) for inclusion in a first output script to lock the first quantity of cryptocurrency (B1)

determine a second hash (H2) of the second redeem script (RS2) for inclusion in a second output script to lock the second quantity of cryptocurrency (B2);

send over a communications network, a first data output (O1) to a blockchain network, the first data output (O1) comprising:
- a first indication of a first-transfer of the first quantity of cryptocurrency (B1) to the second user (B), locked by the first output script including the first hash (H1);
- a second indication of a second-transfer of the second quantity of cryptocurrency (B2) to the first user (A), locked by the second output script including the second hash (H2).

* * * * *